United States Patent [19]
Castoe

[11] 3,760,628
[45] Sept. 25, 1973

[54] CASTER AND CAMBER ADJUSTMENT TOOL

[75] Inventor: John H. Castoe, Sunland, Calif.

[73] Assignee: Applied Power Industries, Inc., Milwaukee, Wis.

[22] Filed: Jan. 19, 1972

[21] Appl. No.: 218,923

[52] U.S. Cl.................... 72/458, 72/479, 72/704
[51] Int. Cl............................................ B21j 13/08
[58] Field of Search................... 72/704, 705, 458, 72/476, 479, 480

[56] References Cited
UNITED STATES PATENTS

| | | | |
|---|---|---|---|
| 2,764,215 | 9/1956 | Adams et al. | 72/705 |
| 2,518,052 | 8/1950 | Nielsen | 72/704 |
| 2,572,654 | 10/1951 | Nielsen | 72/705 |
| 2,425,556 | 8/1947 | Nielsen | 72/458 |
| 2,635,668 | 4/1953 | Redinbaugh | 72/458 |
| 2,744,427 | 5/1956 | Albert | 72/458 |
| 2,674,142 | 4/1954 | Angelo et al. | 72/458 |
| 2,365,731 | 12/1944 | Simons | 72/458 |

Primary Examiner—Richard J. Herbst
Assistant Examiner—M. J. Keenan
Attorney—Roy E. Petherbridge

[57] ABSTRACT

A caster and camber adjustment tool including a saddle or yoke member for contacting the upper inner arm or shaft of a wheel assembly. The saddle member is affixed to one end of an elongated rod wherein the other end of the rod includes an insertion projection which affixes the end of the rod to an automobile body. An elongated curved handle is swivelly attached to the rod in a manner that the desired camber and caster adjustment of the wheel may be performed by manually moving the handle.

10 Claims, 7 Drawing Figures

PATENTED SEP 25 1973　　3,760,628

CASTER AND CAMBER ADJUSTMENT TOOL

BACKGROUND OF THE INVENTION

This invention relates in general to an adjustment tool and in particular, to a novel camber and caster adjustment tool.

More specifically, the invention relates to a camber and caster adjustment tool for use in vehicles to perform desired camber and caster adjustments of the wheels. The tool includes an elongated handle member which permits desired adjustment of a wheel even when access to the adjustment elements of the vehicle are relatively difficult.

During the normal operation of automobiles and the like, it is necessary to adjust periodically the wheel of the vehicle for both camber and caster. A caster adjustment of the wheel refers to adjusting the wheel with respect to its forward or rearward tilt of the top of the wheel spindle. On the other hand, camber is considered to be the amount that the front wheels are tilted at the top. It has been found that certain automobiles, particularly so-called compact vehicles, such as the Pinto car, are inconvenient to adjust the camber and caster since the elements of the wheel assembly are positioned at a relatively cramped and inaccessible location.

The tools used in the prior art to make alignment adjustments of such vehicles have not proven to be satisfactory since the devices must be manipulated at a position which is inconveniently accessible to a mechanic thereby making the camber and caster adjustments difficult. Moreover, the prior art tools do not achieve an effficient and rapid alignment of the wheels since they are not readily attached into operative position on the wheel assembly and also require considerable time in performing alignment. One serious disadvantage presented by prior art techniques is the fact that the person making the alignment adjustment has to be in position under the car and can not exert a sufficient leverage on the inner arm of the wheel assembly to effect adjustment. In addition, the necessity that the mechanic be under the car makes it inconvenient to observe the conventional gauge utilized in indicating the caster and camber of a wheel.

SUMMARY OF THE INVENTION

It is, therefore, an object of this invention to improve the adjustment of a wheel assembly of a vehicle.

Another object of this invention is to improve the tool utilized in effecting caster and camber adjustment of a wheel of a vehicle.

A further object of this invention is to reduce the cost and complexity of a tool utilized in making camber and caster adjustments.

Still another object of this invention is to perform camber and caster adjustment on a vehicle from a position which is readily accessible by a mechanic.

These and other objects are attained in accordance with the present invention wherein there is provided a camber and caster adjustment tool having a saddle or yoke member for contacting the upper inner shaft or arm of a wheel assembly of a vehicle and an elongated handle which transmits leverage to the saddle or yoke member in a manner that the upper inner arm of the wheel assembly moves to make the appropriate adjustments of the wheel. The elongated handle is swivelly amounted to the tool so that when the tool is positioned adjacent either the front or rear of the front wheel housing, the handle can be moved to avoid any obstructions caused by the wheel itself and the like. The handle extends from the tool to an accessible position where the mechanic merely pulls the handle in a manner to effect desired movement of the shaft. The saddle member is mounted on an elongated rod wherein the other end of the rod is adapted to be inserted and retained in a hole which is provided on the cross member of a conventional vehicle.

The novel tool of the invention permits the user to make caster and camber adjustments from a position adjacent the side of an automobile which allows the operator to readily view any instruments used in conjunction with the alignment procedure. In addition, the simple design of the tool provides an instrument which is both inexpensive to manufacture and efficient to use. Also, because of the design of the tool, it is possible to exert a significantly greater amount of torque on the shaft than could readily be exerted by the prior art devices thereby reducing the time and effort needed for making alignment adjustments.

BRIEF DESCRIPTION OF THE DRAWINGS

Further objects of the invention, together with additional features contributing thereto and advantages accruing therefrom, will be apparent from the following description of an embodiment of the invention when read in conjunction with the accompanying drawings, wherein.

DESCRIPTION OF THE PREFERRED EMBODIMENT

Figure 1:
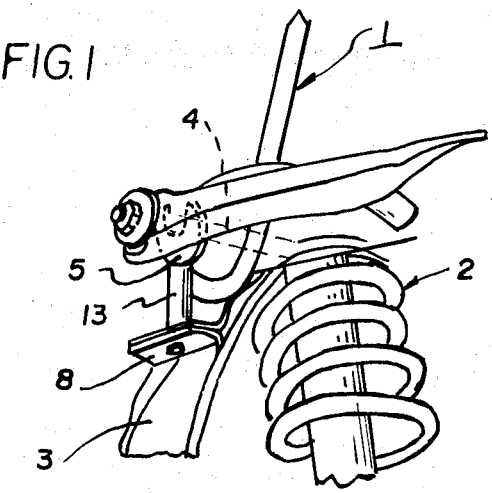
FIG. 1 is a perspective illustration of a camber and caster adjustment tool of the invention in operative position on a wheel assembly.
Figure 4:
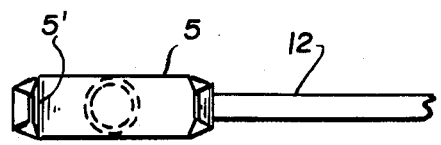
FIG. 4 is a top schematic illustration of the adjustment tool of FIG. 2.

Referring now to FIG. 1 there is illustrated an embodiment of the caster and camber adjustment tool 1 of the invention in operative position on a wheel assembly 2 which is attached to a vehicle chassis 3. The wheel assembly of a vehicle such as a compact Pinto includes an upper inner shaft or arm 4 which is generally attached to the vehicle body by means of a pair of bolts (not shown) which affix the shaft and wheel assembly to the vehicle body.

Referring now to FIGS. 2 to 6, the novel camber and caster adjustment tool of the invention is best shown. Adjustment tool 1 includes a yoke or saddle member 5 which is adapted to contact and embrace on a curved inner surface 5' thereof a portion of upper inner shaft or arm 4 to effect camber and caster adjustment of the front wheels in a manner to be described in detail later. Saddle member 5 is unitarily affixed to an end of a rod 6 by any suitable technique. The other end of rod 6 is provided with an end projection 7 which is utilized to be inserted in a hole 8 generally provided in automobile chassis whereby insertion of projection 7 into hole 8 affixes one end of the rod in order to effect movement of shaft 4. End projection 7 includes an end disc 9 which is formed by a circumferential groove 10 located near the end of rod 6 wherein disc 9 acts to maintain the projection in hole 8 during manipulation of the tool.

Figure 2:
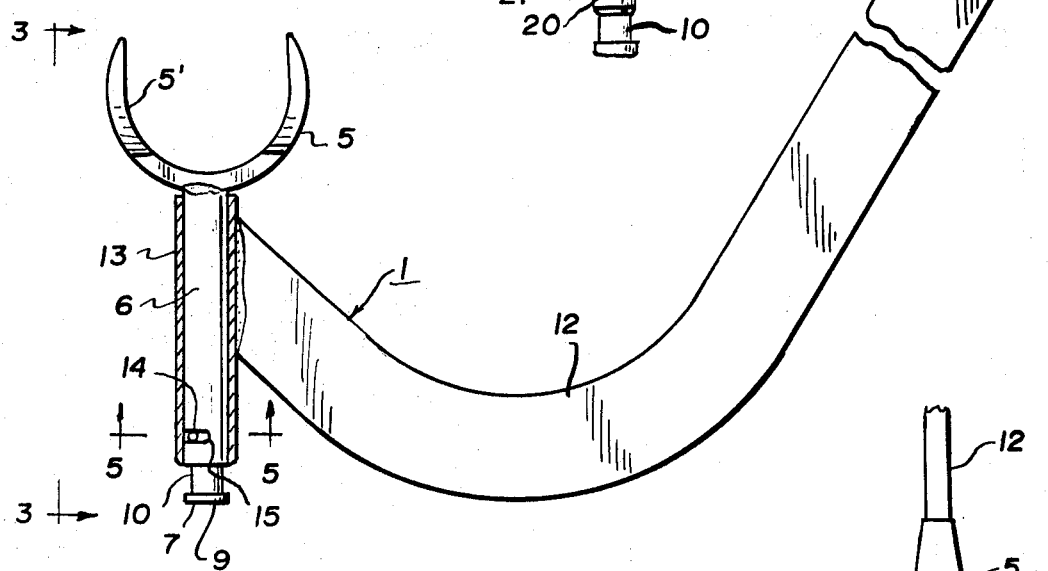
FIG. 2 is a schematic side illustration with parts broken away of the camber and caster adjustment tool of the invention.
Figure 5:
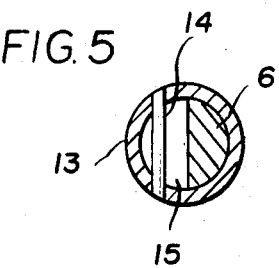
FIG. 5 is a sectional view taken along line 5—5 of FIG. 2 of the sleeve and inner rod of the adjustment tool of FIG. 2.
Figure 6:
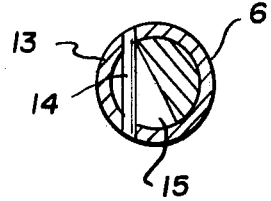
FIG. 6 is a sectional view taken along line 5—5 of FIG. 2 showing a different angular position between the outer sleeve and inner rod of the adjustment tool.
Figure 3:
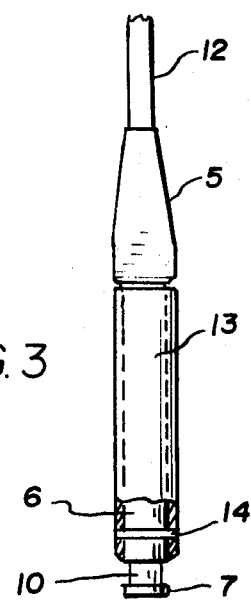
FIG. 3 is a partial end schematic illustration with parts broken away taken along line 3—3 of FIG. 2 of the tool of FIG. 2.

The tool is manipulated during adjustment procedures by means of an elongated curved handle member which extends at one end above the upper saddle 5 adjacent the wheel so that a mechanic or other user can grasp the handle from a position above the wheel assembly adjacent the side of the vehicle. Handle 12 is attached to rod 6 by means of a hollow sleeve 13 whereby one end 12a of the handle is affixed to the sleeve by a suitable technique such as soldering and the like. The sleeve extends substantial the length of rod 6 in a surrounding relationship thereto whereby the sleeve is rotatably movable relative to the rod. A pin 14 extends through the sleeve 13 and through a groove 15 formed in a sector of the rod 6 as best shown in FIGS. 2, 5 and 6. Pin 14 is affixed at its two ends to the sleeve whereby the height of the slot 15 is slightly larger than the other diameter of the pin. The pin and slot arrangement serves not only to lock the sleeve in a longitudinal direction with respect to rod 6, but also limits the rotational movement of the sleeve and handle relative to rod 6 in a plane normal to the longitudinal axis of the rod. Thus, handle 12 can be swiveled in a certain arc relative to yoke 5 and rod 6 in a manner to permit the handle to be accessible even though obstacles such as the wheel and other elements are encountered.

In use of the tool of the invention, the tool is positioned at one end of the upper arm or shaft 4 as, for example, at the end adjacent the front of the wheel. The saddle 5 is positioned in embracing relationship to rod 4 and the projection 7 is placed into the hole 8 of the automobile chassis. The bolt (not shown) located adjacent the end of shaft 4 where the tool is located, is loosened an amount to free shaft 4. By then releasing the bolt on the other end, the inner shaft 4 is free and the shaft may be moved for corrective adjustment. Projection 7 is affixed to the vehicle body by the retention of disc 9 to the hole and the mechanic or other user has considerable leverage by pulling or otherwise manipulating handle 12 to exert a force on saddle 5 and shaft 4 for pivotal motion relative to the hole for alignment movement of the shaft. During adjustment of the wheel, the user is positioned adjacent the outside of the wheel whereby camber and caster indicating guages mounted thereon may be easily observed. Upon the desired amount of alignment being achieved, the bolts may be tightened to secure arm 4 to the body.

Under certain circumstances in the use of the tool, it may be desirable to either adjust the wheel by putting the tool adjacent the inner shaft at the front of the wheel as outlined above or alternatively, at the back of the wheel to achieve adjustment and follow the same procedure. Under other conditions, it may be advantageous to undertake the procedure at both ends to insure that the correct alignment has been achieved. It should be apparent that the swiveling ability of handle 12 allows the handle to be moved relative to the yoke to avoid the obstruction of the front wheel or elements of the wheel assembly.

Figure 7:
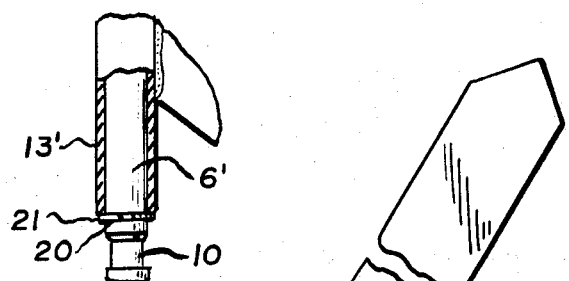
FIG. 7 is a partial end illustration with parts broken away of another embodiment of the adjustment tool of the invention.

Referring now to FIG. 7 there is illustrated another embodiment of the camber and caster adjustment tool of the invention. The tool illustrated in FIG. 7 is identical to the tool described with reference to FIGS. 2 to 6 except that the mounting of sleeve 13' to rod 6' has been modified. Sleeve 13' of FIG. 7 terminates at its end a predetermined distance from projection groove 10 wherein a groove 20 is formed on the exterior of rod 6' immediately adjacent the bottom edge of the sleeve. The groove 20 receives a snap ring 21 having a diameter greater than the depth of groove 20 to retain the sleeve against longitudinal movement relative to the rod but to permit rotational movement in a manner similar to the embodiment previously described.

While the invention is described with reference to preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An adjustment device for adjusting the camber and caster alignment of a wheel of a vehicle comprising:
    a shaft means including a force applying means for applying a desired force to the mounting means of the wheel for adjustment thereof,
    said shaft means further including retention means positioned in a spaced relationship to the force application to retain an end portion of the shaft means to a point on the vehicle body, and
    handle means coupled to the shaft means for manually pivoting the force applying means relative to the retention means to apply an adjustment force to the mounting means of the wheel assembly.

2. The tool of claim 1 wherein the shaft means includes an elongated member.

3. The tool of claim 2 wherein the force applying means is attached to a first end of the elongated member and the retention means is coupled to the other end of the elongated member.

4. The tool of claim 2 wherein the force applying means is a saddle member adapted to contact a shaft of the wheel assembly in a surrounding relationship.

5. The tool of claim 3 wherein the retention means is an elongated projection adapted to be inserted into a hole in the vehicle body.

6. The tool of claim 5 wherein the projection includes an enlarged end for retaining the projection in the hole of the vehicle body.

7. The tool of claim 1 wherein the handle means includes an elongated handle to move the force applying means.

8. The tool of claim 7 wherein the handle is swivelly attached to the shaft means.

9. The tool of claim 8 wherein the handle is coupled to a sleeve positioned in surrounding relationship to the shaft means.

10. The tool pf claim 8 wherein the sleeve is coupled to the shaft means for limited rotational movement relative thereto.

* * * * *

UNITED STATES PATENT OFFICE
CERTIFICATE OF CORRECTION

Patent No. 3,760,628      Dated   September 25, 1973

Inventor(s)  JOHN H. CASTOE

It is certified that error appears in the above-identified patent and that said Letters Patent are hereby corrected as shown below:

Column 3, line 21, "substantial" should read -- substantially -- .  Column 4, line 64, "pf" should read -- of -- .

Signed and sealed this 22nd day of January 1974.

(SEAL)
Attest:

EDWARD M. FLETCHER, JR.
Attesting Officer

RENE D. TEGTMEYER
Acting Commissioner of Patents